United States Patent
Chun et al.

(10) Patent No.: US 12,269,015 B2
(45) Date of Patent: *Apr. 8, 2025

(54) HYDROGEN CHLORIDE OXIDATION REACTION CATALYST FOR PREPARING CHLORINE, AND PREPARATION METHOD THEREFOR

(71) Applicant: HANWHA SOLUTIONS CORPORATION, Seoul (KR)

(72) Inventors: Jeong Hwan Chun, Daejeon (KR); Young Jin Cho, Daejeon (KR); Won Yong Kim, Daejeon (KR); Eun Ji Woo, Daejeon (KR); Ga Ram Lee, Daejeon (KR)

(73) Assignee: HANWAH SOLUTIONS CORPORATION, Seoul (KR)

( * ) Notice: Subject to any disclaimer, the term of this patent is extended or adjusted under 35 U.S.C. 154(b) by 727 days.

This patent is subject to a terminal disclaimer.

(21) Appl. No.: 17/416,514

(22) PCT Filed: Dec. 10, 2019

(86) PCT No.: PCT/KR2019/017358
§ 371 (c)(1),
(2) Date: Jun. 20, 2021

(87) PCT Pub. No.: WO2020/130457
PCT Pub. Date: Jun. 25, 2020

(65) Prior Publication Data
US 2022/0080395 A1    Mar. 17, 2022

(30) Foreign Application Priority Data

Dec. 21, 2018 (KR) .................. 10-2018-0167858

(51) Int. Cl.

| | | |
|---|---|---|
| *B01J 21/04* | (2006.01) | |
| *B01J 6/00* | (2006.01) | |
| *B01J 21/06* | (2006.01) | |
| *B01J 21/08* | (2006.01) | |
| *B01J 23/10* | (2006.01) | |
| *B01J 23/46* | (2006.01) | |
| *B01J 23/63* | (2006.01) | |
| *B01J 35/40* | (2024.01) | |
| *B01J 35/61* | (2024.01) | |
| *B01J 37/02* | (2006.01) | |
| *C01B 7/04* | (2006.01) | |

(52) U.S. Cl.
CPC ............ *B01J 23/462* (2013.01); *B01J 6/001* (2013.01); *B01J 21/063* (2013.01); *B01J 35/40* (2024.01); *B01J 35/613* (2024.01); *B01J 35/615* (2024.01); *B01J 37/0213* (2013.01); *B01J 37/0236* (2013.01); *C01B 7/04* (2013.01)

(58) Field of Classification Search
CPC ........ B01J 21/04; B01J 21/063; B01J 21/066; B01J 21/08; B01J 23/10; B01J 23/462; B01J 23/63; B01J 35/40; B01J 35/613; B01J 35/615; B01J 37/0213; B01J 37/0236; B01J 6/001; C01B 7/04
See application file for complete search history.

(56) References Cited

U.S. PATENT DOCUMENTS

| | | | | |
|---|---|---|---|---|
| 4,868,148 A * | 9/1989 | Henk | ...... | B01J 23/89 502/262 |
| 5,008,090 A * | 4/1991 | Joy, III | ...... | B01D 53/945 423/213.2 |
| 5,871,707 A * | 2/1999 | Hibi | ...... | C01B 7/04 423/502 |
| 6,913,739 B2 * | 7/2005 | Shore | ...... | B01J 23/894 423/247 |
| 7,126,035 B2 * | 10/2006 | Kuhrs | ...... | B01J 27/122 502/103 |

(Continued)

FOREIGN PATENT DOCUMENTS

| | | |
|---|---|---|
| CN | 101541423 A | 9/2009 |
| CN | 101663092 A | 3/2010 |
| CN | 102271807 A | 12/2011 |
| CN | 102803130 A | 11/2012 |
| CN | 108084707 A | 5/2018 |
| CN | 109401288 A | 3/2019 |
| JP | 2002-292279 A | 10/2002 |
| JP | 4069619 B2 | 4/2008 |

(Continued)

OTHER PUBLICATIONS

Applied Surface Science 246 (2005) 222-228.

(Continued)

*Primary Examiner* — Cam N. Nguyen
(74) *Attorney, Agent, or Firm* — Harvest IP Law, LLP

(57) ABSTRACT

The present invention relates to a catalyst for obtaining chlorine ($Cl_2$) through an oxidation reaction of hydrogen chloride (HCl), and more particularly, to an oxidation reaction catalyst for preparing $Cl_2$ from HCl by addition of a second heterogeneous material to a $RuO_2$-supported catalyst using $TiO_2$ as a support, and a preparation method therefor. According to an embodiment of the present invention, a hydrogen chloride oxidation reaction catalyst for use in a method for preparing chlorine by oxidizing hydrogen chloride includes a support and a heterogeneous material in an active ingredient. The catalyst according to the present invention has both increased catalytic activity at a low temperature and enhanced thermal stability, and thus a catalyst having improved durability such as thermal stability at a high temperature is provided. Therefore, since thermal stability is secured, the performance of the catalyst is maintained for a long time even at a high temperature.

3 Claims, No Drawings

(56) References Cited

U.S. PATENT DOCUMENTS

| | | | |
|---|---|---|---|
| 7,902,411 B2* | 3/2011 | Kuhrs | B01J 27/122 |
| | | | 502/261 |
| 8,536,374 B2* | 9/2013 | Alshammari | B01J 23/48 |
| | | | 562/549 |
| 8,710,281 B2* | 4/2014 | Nagaki | C07C 29/60 |
| | | | 568/903 |
| 8,945,497 B2* | 2/2015 | Headdock | B01J 23/63 |
| | | | 502/339 |
| 9,084,985 B2* | 7/2015 | Iida | B01J 21/18 |
| 9,156,024 B2* | 10/2015 | Henze | C01B 7/04 |
| 9,186,652 B2* | 11/2015 | Nishimoto | B01J 21/06 |
| 9,468,913 B2* | 10/2016 | Wolf | B01J 23/20 |
| 9,511,351 B2* | 12/2016 | Feaviour | B01J 23/42 |
| 9,670,115 B2* | 6/2017 | Sun | B01J 35/612 |
| 9,797,287 B2* | 10/2017 | Bartley | F02M 26/13 |
| 9,855,549 B2* | 1/2018 | Gao | B01J 23/002 |
| 9,889,431 B2* | 2/2018 | Seki | B01J 35/612 |
| 10,226,755 B2* | 3/2019 | Umeno | B01J 23/002 |
| 10,300,474 B2* | 5/2019 | Li | B01J 29/44 |
| 10,486,141 B2* | 11/2019 | Vardon | B01J 23/8913 |
| 10,569,256 B2* | 2/2020 | Dang | B01J 37/023 |
| 10,695,749 B2* | 6/2020 | Xiao | B01J 23/89 |
| 10,792,646 B2* | 10/2020 | Xing | C07C 5/322 |
| 10,894,760 B2* | 1/2021 | Vardon | C08G 69/28 |
| 11,203,010 B2* | 12/2021 | Miller | B01J 21/063 |
| 2002/0131925 A1* | 9/2002 | Shore | B01J 35/56 |
| | | | 423/247 |
| 2003/0012719 A1* | 1/2003 | Roos | B01J 23/52 |
| | | | 423/247 |
| 2006/0140849 A1* | 6/2006 | Kuhrs | B01J 23/52 |
| | | | 423/502 |
| 2008/0200703 A1* | 8/2008 | Van Laar | C07D 303/30 |
| | | | 502/261 |
| 2010/0113260 A1* | 5/2010 | Hagemeyer | C01G 1/02 |
| | | | 502/328 |
| 2011/0044874 A1* | 2/2011 | Dang | B01J 29/0325 |
| | | | 502/65 |
| 2011/0189079 A1* | 8/2011 | Seki | B01J 20/08 |
| | | | 423/502 |
| 2011/0268649 A1* | 11/2011 | Henze | B01J 23/96 |
| | | | 423/502 |
| 2011/0274613 A1* | 11/2011 | Henze | B01J 23/96 |
| | | | 502/37 |
| 2012/0027665 A1* | 2/2012 | Henze | C01B 7/04 |
| | | | 502/328 |
| 2012/0058036 A1* | 3/2012 | Yasutake | C10K 3/04 |
| | | | 423/247 |
| 2012/0148478 A1* | 6/2012 | Schmidt | B01J 35/66 |
| | | | 977/773 |
| 2013/0087461 A1* | 4/2013 | Kintrup | H01M 4/9075 |
| | | | 502/325 |
| 2013/0253249 A1* | 9/2013 | Baucherel | B01J 27/20 |
| | | | 502/185 |
| 2014/0205533 A1* | 7/2014 | Schmidt | B01J 35/19 |
| | | | 423/502 |
| 2014/0224666 A1* | 8/2014 | Kintrup | B01J 23/462 |
| | | | 427/126.3 |
| 2014/0241976 A1* | 8/2014 | Schmidt | C01B 7/04 |
| | | | 423/502 |
| 2014/0248208 A1* | 9/2014 | Schmidt | B01J 35/615 |
| | | | 423/502 |
| 2015/0315021 A1 | 11/2015 | Nishimoto | |
| 2015/0360210 A1* | 12/2015 | Henze | B01J 38/54 |
| | | | 502/24 |
| 2017/0081187 A1* | 3/2017 | Schmidt | C01B 7/0743 |
| 2018/0078926 A1* | 3/2018 | Chen | B01D 53/944 |
| 2018/0229220 A1* | 8/2018 | Dang | B01J 23/626 |
| 2019/0023568 A1* | 1/2019 | Rittermeier | B01J 35/19 |
| 2019/0046967 A1* | 2/2019 | Li | B01J 35/397 |

FOREIGN PATENT DOCUMENTS

| | | |
|---|---|---|
| JP | 4285179 B2 | 6/2009 |
| JP | 2014517756 A | 9/2014 |
| JP | 2014522797 A | 9/2014 |
| JP | 5624221 B2 | 11/2014 |
| KR | 1020090084949 A | 8/2009 |
| KR | 1020140102205 A | 8/2014 |
| KR | 2018-0111828 A | 10/2018 |
| KR | 1020180111828 A | 10/2018 |

OTHER PUBLICATIONS

"Ru—Ti Oxide Based Catalysts for HCl Oxidation : The Favorable Oxygen Species and Influence of Ce additive", Jian Shi, et al., vol. 9, No. 2, Jan. 22, 2019, Pate 108, XP055948493.

Extended European Search Report dated Oct. 4, 2024.

* cited by examiner

HYDROGEN CHLORIDE OXIDATION REACTION CATALYST FOR PREPARING CHLORINE, AND PREPARATION METHOD THEREFOR

CROSS-REFERENCE TO RELATED APPLICATIONS

This application is a National Stage of International Application No. PCT/KR2019/017358 filed Dec. 10, 2019, claiming priority based on Korean Patent Application No. 10-2018-0167858 filed Dec. 21, 2018.

TECHNICAL FIELD

The present invention relates to a catalyst for obtaining chlorine ($Cl_2$) through an oxidation reaction of hydrogen chloride (HCl), and more particularly, to an oxidation reaction catalyst for preparing chlorine ($Cl_2$) from hydrogen chloride (HCl) by addition of a heterogeneous material to a $RuO_2$-supported catalyst using $TiO_2$ as a support, and a preparation method therefor.

BACKGROUND ART

In a catalytic oxidation method of hydrogen chloride developed by Deacon in 1868, hydrogen chloride is oxidized with oxygen to form chlorine in an exothermic equilibrium reaction. Hydrogen chloride is formed in large quantities as a co-product in a phosgenation reaction such as, for example, isocyanate production. Hydrogen chloride formed in isocyanate production is mainly used in an oxychloride reaction of ethylene to 1,2-dichloroethane which is subsequently treated to form vinyl chloride and finally PVC. In Korea, most hydrochloric acid and hydrogen chloride are prepared and sold in aqueous phase (20% or 35% hydrochloric acid), except for the reaction of producing VCM by reacting hydrogen chloride with ethylene in an OxyChlorination reactor, or are discarded after neutralization.

Catalysts used in the hydrogen chloride oxidation reaction include ruthenium-based catalysts, copper-based catalysts, and cerium-based catalysts. Ruthenium-based catalysts have a lower reaction temperature with a small amount of catalyst than copper-based catalysts or cerium-based catalysts.

A reaction for producing chlorine by oxidation of hydrogen chloride is an equilibrium reaction. As a reaction temperature increases, it is disadvantageous in equilibrium and an equilibrium conversion rate decreases. Therefore, a catalyst having a lower reaction temperature is advantageous in equilibrium at the time of the reaction and a higher conversion rate of hydrogen chloride may be obtained.

However, most of the catalysts described in the related art mainly exhibit high activity at a high temperature. In addition, during high-temperature operation, the performance of the catalyst decreases in a short period of several months. That is, the supported ruthenium oxide has difficulty in satisfying both conditions of thermal stability and catalyst life at the same time.

Japanese Patent Laid-Open No. 2014-522797 discloses a method for preparing chlorine using a cerium oxide catalyst in an isothermal reactor, wherein a gas-phase oxidation reaction of hydrogen chloride is enabled by using a ruthenium and cerium oxide catalyst supported on titanium oxide.

Japanese Patent Laid-Open No. 2014-503341 discloses a catalyst for preparing chlorine by oxidation of hydrogen chloride and a preparation method therefor, wherein a catalyst prepared by supporting a complex active ingredient such as cerium, ruthenium, and copper on titanium dioxide is applied to an oxidation reaction of hydrogen chloride. However, the above published Japanese patent has a limitation in that there is no description of specific effects of maintaining thermal stability and long-term catalyst performance.

Japanese Patent Laid-Open No. 2014-517756 discloses a method for preparing chlorine by using a cerium oxide catalyst in an isothermal reactor. This patent relates to a process of preparing chlorine by using a cerium oxide catalyst, and relates to a process of charging and using a ruthenium oxide catalyst and a cerium oxide catalyst in different layers by designing a reactor in multiple stages. However, there is a limitation in that ruthenium oxide and cerium oxide are charged and used in different layers.

Finally, Korean Patent Application Publication No. 2018-011828 discloses a catalyst for gas-phase oxidation of hydrogen chloride for chlorine gas containing cerium and ruthenium. In particular, there is a difference in that cerium and ruthenium are supported on zirconium dioxide.

Existing ruthenium-based catalysts prepare chlorine at a relatively low reaction temperature with a small amount of catalyst. Due to low thermal stability thereof, the performance of the catalyst decreases within several months during high temperature operation. Therefore, there is an urgent need to develop a ruthenium-based catalyst capable of overcoming the above problems and securing thermal stability to maintain the performance of the catalyst for a long time even at a high temperature.

(Patent Literature 1) Japanese Patent Laid-Open No. 2014-522797 (2014. Sep. 8)
(Patent Literature 2) Japanese Patent Laid-Open No. 2014-503341 (2014. Oct. 3)
(Patent Literature 3) Japanese Patent Laid-Open No. 2014-517756 (2014. Sep. 8)
(Patent Literature 4) Korean Patent Application Publication No. 2014-0102205 (2014. Aug. 21)

DESCRIPTION OF EMBODIMENTS

Technical Problem

An object of the present invention is to solve the above-described problems.

Another object of the present invention is to provide a method for preparing a ruthenium oxide-supported catalyst used in a process of producing chlorine by oxidizing hydrogen chloride.

In particular, the present invention aims to solve a problem that the performance of catalyst decreases within several months during high temperature operation due to low thermal stability thereof.

An object of the present invention is to provide a catalyst that enhances catalytic activity at a low temperature and enhances thermal stability to improve durability at a high temperature.

Solution to Problem

In order to achieve the above-described objects of the present invention and achieve the characteristic effects of the present invention described below, the characteristic construction of the present invention is as follows.

According to an embodiment of the present invention, a hydrogen chloride oxidation reaction catalyst for use in a method for preparing chlorine by oxidizing hydrogen chloride includes a support and a heterogeneous material as an active ingredient.

According to an embodiment of the present invention, a hydrogen chloride oxidation reaction catalyst for use in a method for preparing chlorine by oxidizing hydrogen chloride includes 0.5-10 parts by weight of a heterogeneous material, 1-10 parts by weight of ruthenium oxide as an active ingredient, and 80-99 parts by weight of a support, based on 100 parts by weight of the total catalyst after drying.

The heterogeneous material may include at least one selected from ceria, alumina, and silica. Preferably, the heterogeneous material may include ceria. However, the present invention is not limited thereto.

In addition, the support may include at least one selected from alumina, titania, and zirconia.

According to an embodiment of the present invention, the support may have a specific surface area of 5-300 $m^2/g$, and preferably 5-100 $m^2/g$, but the present invention is not limited thereto.

According to an embodiment of the present invention, the catalyst is at least one selected from a powder form, a particle form, and a pellet form. Preferably, a pellet form may be provided.

According to an embodiment of the present invention, a method for preparing a hydrogen chloride oxidation reaction catalyst includes: (a) a first supporting step of preparing a solution in which at least one precursor selected from heterogeneous materials is dissolved in a solvent and supporting the solution on at least one support selected from alumina, titania, and zirconia; (b) a step of performing drying and calcining after the first supporting step to obtain a solid by cooling at room temperature; (c) a second supporting step of preparing and supporting a solution in which a ruthenium precursor is dissolved in a solvent; (d) a step of adding the solid after the second supporting step; and (e) a step of performing secondary drying and calcining.

In this case, the heterogeneous material in the step (a) may include at least one selected from a cerium precursor, an aluminum precursor, and a silica precursor in an amount of 0.001-10 parts by weight based on 100 parts by weight of the total solution before the secondary drying and calcining, and the support may include at least one selected from alumina, titania, and zirconia.

In addition, the ruthenium precursor in the step (c) may be included in an amount of 0.001-10 parts by weight based on 100 parts by weight of the total solution before the secondary drying and calcining.

The solvent in the step (a) may include at least one selected from the group consisting of water, alcohol, and nitrile. Preferably, the solvent may be distilled water, deionized water, or monoalcohol, but the present invention is not limited thereto.

According to an embodiment of the present invention, the drying in the steps (b) and (e) may be performed for 3-5 hours in an air condition of room temperature to 120° C. The ruthenium precursor in the step (c) may be included in an amount of 0.1-10 parts by weight based on 100 parts by weight of the entire solution before the secondary drying and calcining. The calcining may be performed after the drying. The calcining in the steps (b) and (e) may be performed at 300-400° C. for 2-4 hours and cooled to room temperature.

According to an embodiment of the present invention, a method for preparing chlorine through oxidation of hydrogen chloride in the presence of the catalyst is provided. In this case, a reaction temperature for preparing chlorine may be 200-450° C.

Advantageous Effects of Disclosure

A catalyst according to the present invention is capable of enhancing catalytic activity at a low temperature and enhancing thermal stability to improve durability such as thermal stability at a high temperature. Therefore, since the thermal stability of the catalyst is secured, the performance of the catalyst can be maintained for a long time even at a high temperature.

The catalyst prepared by the preparation method according to the present invention may be used to prepare chlorine by oxidizing hydrogen chloride, thereby improving a chlorine conversion rate.

BEST MODE

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

According to an embodiment of the present invention, as a catalyst used in a method for preparing chlorine by oxidizing hydrogen chloride, a hydrogen chloride oxidation reaction catalyst including heterogeneous materials in a support and an active ingredient is provided. In this case, the catalyst may include 0.5-10 parts by weight of a heterogeneous material, 1-10 parts by weight of ruthenium oxide as an active ingredient, and 80-99 parts by weight of a support, based on 100 parts by weight of the total catalyst after drying.

According to an embodiment of the present invention, the heterogeneous material may include at least one selected from ceria, alumina, and silica.

The catalyst includes 1-10 parts by weight of ruthenium oxide as the active ingredient and 0.5-10 parts by weight of the heterogeneous material, based on 100 parts by weight of the total catalyst after drying. After a catalyst precursor is supported, dried, and calcined, ruthenium oxide may be finally prepared. In this case, when the ruthenium oxide is included in an amount of 2.0 parts by weight, the heterogeneous material may be included in an amount of 0.5-10.0 parts by weight. Preferably, when the ruthenium oxide is included in an amount of 2.0 parts by weight, the heterogeneous material may be included in an amount of 0.5-10.0 parts by weight. At this time, ceria is preferably provided as the heterogeneous material.

Ceria refers to cerium oxide, and cerium oxide provides stability even at a relatively high temperature. In the case of the reaction including the cerium oxide, thermal stability is provided at an average temperature of 200-600° C., and preferably 250-550° C. However, when the average temperature is higher than 600° C., there is a disadvantage in a chlorine conversion rate during chlorine production, and when the average temperature is lower than 200° C., the catalytic activity is lowered. Therefore, it is necessary to control the reaction within the above range.

In addition, the heterogeneous material may be included in an amount of 0.5-10.0 parts by weight. When the content of the heterogeneous material is greater than the above range, catalytic activity is lowered, and when the content of the heterogeneous material is less than the above range, it is insufficient in ensuring stability against heat.

According to an embodiment of the present invention, the ruthenium precursor may exist in the form of a complex salt and may include metal salts such as halide, nitrate, halogenoate, oxoate, oxyhalide, and chloride. For example, the ruthenium precursor may include $RuCl_3$, $RuBr_3$, $Ru(NO)(NO_3)_3$, $K_3RuCl_6$, $K_2RuCl_6$, $K_2RuO_4$, $Na_2RuO_4$, $Ru_2OCl_4$, $Ru_2OCl_5$, $Ru_2OCl_6$, and the like, but the present invention is not limited thereto.

According to an embodiment of the present invention, halide and nitrate are provided as the ruthenium precursor. Most preferably, ruthenium chloride containing chloride and ruthenium nitrosilnitrate of ruthenium nitrate are provided as the ruthenium precursor. In some cases, as the ruthenium compound, a hydrate of a ruthenium compound may be provided, and two or more selected from the ruthenium compounds may be provided.

The ruthenium precursor may be used in a powder form or a solution form and mixed in a solvent. A solid support may be suspended in the solvent to form a precipitate and may be deposited on the solid support. The supporting includes impregnation or immersion. In this case, the temperature is usually 0-100° C., and preferably 0-50° C., and the pressure is usually 0.1-1 MPa, and preferably atmospheric pressure. The supporting may be performed under an air atmosphere or an inert gas atmosphere such as nitrogen, helium, argon, and oxygen dioxide. In this case, water vapor may be included. The supporting is preferably performed under the inert gas atmosphere, but the present invention is not limited thereto.

Finally, the support may be included in an amount of 80-99 parts by weight.

An embodiment of the present invention provides a hydrogen chloride oxidation reaction catalyst in which the support includes at least one selected from alumina, titania, and zirconia. Preferably, a titania support may be provided. The titania support may include anatase-type titania, rutile-type titania, amorphous titania, or any mixture thereof.

In addition, the titania support may include an oxide such as alumina, zirconia, or niobium oxide. According to an embodiment of the present invention, a rutile-type titania is preferably provided, and the present invention is not limited thereto. The specific surface area of the titania support may be measured by a commonly used BET method, and the specific surface area is 5-300 $m^2/g$, and preferably 5-100 $m^2/g$. When the specific surface area is greater than the above range, it may be difficult to secure the thermal stability of ruthenium oxide, and when the specific surface area is less than the above range, high dispersion is difficult and the activity of the catalyst is also lowered.

In the case of the aluminum support, alpha-alumina is preferably provided. Since this has a low BET specific surface area, it is preferable in that absorption of other impurities is difficult to occur. In this case, the specific surface area may be 10-500 $m^2/g$, and preferably 20-350 $m^2/g$.

The zirconia support has pores in a range of 0.05-10 m, and the specific surface area is the same as described above.

According to an embodiment of the present invention, the hydrogen chloride oxidation reaction catalyst for preparing chlorine may be at least one selected from powder, particle, and pellet forms. The hydrogen chloride oxidation reaction catalyst is preferably the pellet or powder form, and most preferably the pellet form. The diameter is preferably 5 mm or less. When the diameter of the molded body is excessively large, it may provide a disadvantage in the activity of the catalyst.

According to an embodiment of the present invention, a method for preparing a hydrogen chloride oxidation reaction catalyst includes: (a) a first supporting step of preparing a solution in which at least one precursor selected from heterogeneous materials is dissolved in a solvent and supporting the solution on at least one support selected from alumina, titania, and zirconia; (b) a step of performing drying and calcining after the first supporting step to obtain a solid by cooling at room temperature; (c) a second supporting step of preparing and additionally supporting a solution in which a ruthenium precursor is dissolved in a solvent; (d) a step of adding the solid after the second supporting step; and (e) a step of performing secondary drying and calcining.

In this case, the heterogeneous material may include at least one selected from a cerium precursor, an aluminum precursor, and a silica precursor, and may be included in an amount of 0.001-10 parts by weight based on 100 parts by weight of the total solution before the secondary drying and calcining.

The cerium precursor may exist in the form of a complex salt, and may include a cerium compound, in particular, a metal salt such as cerium nitrate, cerium acetate, or cerium chloride. Preferably, cerium nitrate is provided, but the present invention is not limited thereto.

According to an embodiment of the present invention, in the step (c), the ruthenium precursor may be included in an amount of 0.001-10 parts by weight based on 100 parts by weight of the total solution before the secondary drying and calcining. Since this is the same as described above, a description thereof will be omitted.

According to another embodiment of the present invention, the hydrogen chloride oxidation reaction catalyst may be prepared by: (i) a step of preparing a solution in which at least one precursor selected from heterogeneous materials is dissolved in a solvent and supporting the solution on at least one support selected from alumina, titania, and zirconia; (ii) a step of preparing and additionally supporting a solution in which a ruthenium precursor is dissolved in a solvent; (iii) a step of performing drying after the additionally supporting; and (iv) a step of performing calcining.

That is, after supporting, drying, and calcining the heterogeneous material, the heterogeneous material may be added to the solution in which the ruthenium precursor is dissolved in the solvent, and may be dried and calcined again to prepare the catalyst. After supporting the heterogeneous material and continuously supporting the ruthenium precursor, the catalyst may be prepared by drying and calcining. In other words, the order can be modified as necessary, which means that it is possible to freely modify and prepare the catalyst at the level of those of ordinary skill in the art.

The solvent used in the method for preparing the catalyst may include at least one selected from the group consisting of water, alcohol, and nitrile.

The water may include high purity water such as distilled water, ion-exchanged water, or deionized water (DIW).

When the water to be used contains impurities, the impurities may adhere to the catalyst, which may reduce the activity of the catalyst.

In the case of the alcohol, the organic solvent may be monoalcohol, and a primary alcohol of C3 or higher is provided. A C3 alcohol-based organic solvent is preferably provided. 1-propanol is preferably provided. By using high wettability and hydrophobicity of the solution, the ruthenium component may be supported only on the outer surface of the titania support with a hydroxy group. The degree of dispersion of ruthenium supported on the surface of a titanium oxide molded support or a powder support may be increased.

There is no limitation to the amount of the solvent to be used. However, when the amount of the solvent is excessively large, the drying time is excessively long. Therefore, the amount of the solvent can be freely adjusted at the level of those of ordinary skill in the art.

The drying used in the preparation method may be performed for 3-5 hours in an air condition of room temperature to 120° C. The drying may be performed while rotating and stirring. The drying may be performed while vibrating a drying container or using a stirrer provided in the container, but the present invention is not limited thereto. A drying temperature is usually room temperature to about 120° C., and a pressure is usually 0.1-1 MPa, and preferably atmospheric pressure.

According to an embodiment of the present invention, ruthenium oxide is included an amount of 1-10 parts by weight based on 100 parts by weight of the finally prepared catalyst according to the method for preparing the catalyst. Preferably, the ruthenium oxide may be included in an amount of 2-5 parts by weight. When the amount of the finally prepared ruthenium oxide is less than 1 part by weight, the activity as the catalyst may be insufficient, and when the amount of the finally prepared ruthenium oxide is greater than 5 parts by weight, it may be disadvantageous in terms of cost. When the amount of the ruthenium oxide is 2 parts by weight, cerium added as the heterogeneous material may be included in an amount of 0.5-10 parts by weight. Within the above range, it is possible to provide an optimal effect of improving chlorine conversion and thermal stability according to the present invention.

The calcining used in the preparation method may be performed at 300-400° C. for 2-4 hours. After that, cooling to room temperature may be performed. A calcining temperature is a temperature that is usually applied, and preferably 250-450° C. Examples of oxidizing gas may include oxygen-containing gas. An oxygen concentration is 1-30 vol %, which is a usually applied oxygen concentration. As an oxygen source, air or pure oxygen is generally provided. As necessary, an inert gas or water vapor may be included. The oxidizing gas may be preferably air. After calcining at about 350° C. for about 3 hours in an electric furnace under the flow of air, cooling may be performed to room temperature and a ruthenium oxide catalyst may be finally prepared.

According to an embodiment of the present invention, in the hydrogen chloride oxidation reaction catalyst for preparing chlorine, the oxidation number of ruthenium is usually 4, and ruthenium dioxide ($RuO_2$) is provided. However, the oxidation number and form are not limited thereto.

According to an embodiment of the present invention, the hydrogen chloride oxidation reaction catalyst may oxidize hydrogen chloride to prepare chlorine.

According to an embodiment of the present invention, a method for preparing chlorine through oxidation of hydrogen chloride in the presence of the catalyst prepared by any one of the above-described preparation methods is provided.

A reaction method includes a stationary phase method, a fluidized bed method, a gas phase reaction, and the like. The reaction method is preferably the gas phase reaction. This oxidation reaction is an equilibrium reaction. When the oxidation reaction is performed at an excessively high temperature, an equilibrium conversion rate decreases. Thus, the oxidation reaction is preferably performed at a relatively low temperature. The reaction temperature is usually 100-500° C., preferably 200-450° C., and most preferably 300° C. In addition, the reaction pressure is usually about 0.1-5 MPa. As the oxygen source, air may be used, or pure oxygen may be used. A theoretical molar amount of oxygen to hydrogen chloride is ¼ mol, but 0.1-10 times the amount of oxygen is usually provided. In addition, the supply rate of hydrogen chloride is expressed by the gas supply rate per 1 L of catalyst (L/h; 0° C., converted to 1 atmosphere), that is, GHSV, and is usually about 10-20,000 $h^{-1}$. However, the amount of catalyst added at this time may be slightly modified depending on the temperature, the amount of catalyst, and the amount of the prepared chlorine product.

Hereinafter, the structure and operation of the present invention will be described in more detail with reference to preferred examples of the present invention. However, these example are shown by way of illustration and should not be construed as limiting the present invention in any way.

Since contents not described herein can be sufficiently technically inferred by those of ordinary skill in the art, descriptions thereof will be omitted.

Example 1

A solution prepared by dissolving 0.5 g of cerium nitrate hydrate in 5.0 g of DIW was impregnated with 10.0 g of titania powder and then dried in air at 100° C. for 4 hours. The dried solid was calcined at 350° C. for 3 hours in an electric furnace under air flow and gradually cooled to room temperature. The obtained solid was added to a solution prepared by dissolving 1.08 g of ruthenium nitrosyl nitrate dissolved in a nitric acid solution in 320.0 g of DIW, stirred at room temperature for 5 hours, and then dried by using a rotary evaporator. The dried solid was calcined at 350° C. for 3 hours in an electric furnace under air flow and gradually cooled to room temperature to finally obtain a $RuO_2$—$CeO_2$/$TiO_2$ catalyst in which ruthenium oxide was included in an amount of 2.0 parts by weight and ceria was included in an amount of 2.0 parts by weight.

Example 2

A catalyst was prepared in the same manner as in Example 1 by using 0.13 g of cerium nitrate hydrate to finally obtain a $RuO_2$—$CeO_2$/$TiO_2$ catalyst in which ruthenium oxide was included in an amount of 2.0 parts by weight and ceria was included in an amount of 0.5 parts by weight.

Example 3

A catalyst was prepared in the same manner as in Example 1 by using 0.25 g of cerium nitrate hydrate to finally obtain a $RuO_2$—$CeO_2$/$TiO_2$ catalyst in which ruthenium oxide was included in an amount of 2.0 parts by weight and ceria was included in an amount of 1.0 parts by weight.

Example 4

A catalyst was prepared in the same manner as in Example 1 by using 1.25 g of cerium nitrate hydrate to finally obtain a $RuO_2$—$CeO_2/TiO_2$ catalyst in which ruthenium oxide was included in an amount of 2.0 parts by weight and ceria was included in an amount of 5.0 parts by weight.

Comparative Example 1

A solution prepared by dissolving 0.4 g of ruthenium chloride hydrate in 5.0 g of DIW was impregnated with 10.0 g of titania powder (Sakai Co., Ltd.) and then dried in air at 100° C. for 4 hours. The dried solid was calcined at 350° C. for 3 hours in an electric furnace under air flow and gradually cooled to room temperature to finally obtain a $RuO_2/TiO_2$ catalyst in which ruthenium oxide was included in an amount of 2.0 parts by weight.

Experimental Example 1 for evaluating catalytic activity and Experimental Example 2 for evaluating thermal stability were carried out under the following conditions.

Experimental Example 1-Evaluation of Catalytic Activity 1.35 g of the prepared catalyst was diluted with 6.75 g of a titania powder and charged into a nickel reaction tube (a tube having an outer diameter of 1 inch). A catalyst layer was heated to a temperature of 300° C. in the reaction tube, and a reaction was performed while hydrogen chloride and oxygen gas were supplied under normal pressure at a rate of 100 mL/min. After 2 hours from the start of the reaction, the gas at the outlet of the reaction tube was passed through a 15% aqueous potassium iodide solution to perform sampling for 10 minutes. Subsequently, the amount of chlorine prepared was measured by an iodine titration method, and the space time yield (STY) of hydrogen chloride was calculated by the following equation. Results of Experimental Example 1 are shown in Table 1 below.

Space time yield $(STY) = $ [Equation 1]

$$\frac{\text{Amount of chlorine gas generated } (gcl_2)}{\text{Amount of catalyst } (g_{cat}) \times \text{Reaction time (hr)}}$$

Experimental Example 2-Evaluation of Thermal Stability

After the reaction was performed for 24 hours under the conditions of Experimental Example 1, the amount of chlorine prepared was measured to calculate a hydrogen chloride conversion rate A. After that, the catalyst layer was heated to a temperature of 380° C. and the reaction was performed for 24 hours under the same flow rate condition. After the temperature of the catalyst layer was lowered to 300° C., and the reaction was performed for 2 hours under the same flow rate condition. The amount of chlorine prepared was measured to calculate a hydrogen chloride conversion rate B. The thermal stability of the catalyst was compared by calculating the degree of deterioration as shown in the following equation by using the ratio of the conversion rate B to the conversion rate A. Results thereof are shown in Table 2.

Degree of deterioration (%) = [Equation 2]

$$100 - \left(\frac{\text{Conversion rate } B}{\text{Conversion rate } A} \times 100\right)$$

TABLE 1

| Classification | Comparative Example | Example 1 | Example 2 | Example 3 | Example 4 |
|---|---|---|---|---|---|
| Catalyst information | 2 parts by weight of $RuO_2/TiO_2$ | 2 parts by weight of $RuO_2$ - 2 parts by weight of $CeO_2/TiO_2$ | 2 parts by weight of $RuO_2$ - 0.5 parts by weight of $CeO_2/TiO_2$ | 2 parts by weight of $RuO_2$ - 1 part by weight of $CeO_2/TiO_2$ | 2 parts by weight of $RuO_2$ - 5 parts by weight of $CeO_2/TiO_2$ |
| STY | 2.05 | 1.47 | 2.57 | 2.14 | 1.19 |

TABLE 2

| Classification | Comparative Example | Example 1 | Example 4 |
|---|---|---|---|
| Catalyst information | 2 parts by weight of $RuO_2/TiO_2$ | 2 parts by weight of $RuO_2$ - 2 parts by weight of $CeO_2/TiO_2$ | 2 parts by weight of $RuO_2$ - 5 parts by weight of $CeO_2/TiO_2$ |
| Degree of deterioration | 34% | 30% | 7% |

It can be confirmed from the results of Table 1 and Table 2 that it can have superior activity and durability, compared with the existing ruthenium oxide catalyst, according to the amount of cerium oxide added.

In particular, it can be confirmed that the catalytic activity is at the same level or higher in the range of 2 parts by weight of $RuO_2$ and 0.5-1 part by weight of $CeO_2/TiO_2$. Furthermore, it can be confirmed that the degree of deterioration is improved in the range of 2 parts by weight of $RuO_2$ and 2-5 parts by weight of $CeO_2/TiO_2$, compared with Comparative Example.

Accordingly, it can be confirmed that the catalyst according to the present invention has an effect of enhancing catalytic activity at a low temperature according to the content of the heterogeneous metals and enhancing thermal stability to improve durability such as thermal stability at a high temperature. Therefore, improved durability can be confirmed in that the thermal stability is secured and thus the performance of the catalyst can be maintained for a long time even at a high temperature.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A hydrogen chloride oxidation reaction catalyst for use in a method for preparing chlorine by oxidizing hydrogen chloride, wherein the catalyst includes 0.5-10 parts by weight of a heterogeneous material, 1-10 parts by weight of ruthenium oxide as an active ingredient, and 80-99 parts by weight of a support, based on 100 parts by weight of the total catalyst after drying, wherein the heterogeneous material is ceria, wherein the heterogeneous material and ruthenium oxide are supported together on the same support, and wherein the support is titania.

2. The hydrogen chloride oxidation reaction catalyst of claim 1, wherein the support has a specific surface area of 5-300 $m^2/g$.

3. The hydrogen chloride oxidation reaction catalyst of claim 1, wherein the catalyst is at least one selected from a group consisting of a powder form, a particle form, and a pellet form.

* * * * *